United States Patent [19]

Schadow

[11] 4,133,173

[45] Jan. 9, 1979

[54] DUCTED ROCKETS

[75] Inventor: Klaus C. Schadow, Ridgecrest, Calif.

[73] Assignee: The United States of America as represented by the Secretary of the Navy, Washington, D.C.

[21] Appl. No.: 805,944

[22] Filed: Jun. 13, 1977

Related U.S. Application Data

[63] Continuation of Ser. No. 648,239, Jan. 12, 1976, abandoned.

[51] Int. Cl.$^2$ ............................ F02K 9/04; F02K 7/10
[52] U.S. Cl. ......................................... 60/204; 60/207; 60/208; 60/216; 60/251; 60/270 S; 239/265.19
[58] Field of Search ........................ 60/204, 207–210, 60/216, 251, 253, 261, 270 S, 271; 239/265.19

[56] References Cited

U.S. PATENT DOCUMENTS

| | | | |
|---|---|---|---|
| 3,012,400 | 12/1961 | Corson | 60/271 |
| 3,149,460 | 9/1964 | La Rocca | 60/261 |
| 3,167,912 | 2/1965 | Ledwith | 60/253 |
| 3,693,880 | 9/1972 | Versaw | 60/271 |
| 3,942,320 | 3/1976 | Ortwerth et al. | 60/270 S |

OTHER PUBLICATIONS

Schadow, K., "Study of Gas–Phase Reactions in Particle–Laden Ducted Flows", AIAA Journal, vol. 11, No. 7, Jul., 1973; pp. 1042–1044.
Schadow, K., "Influence of Comb. Parameters on Combustion of Particle–Laden Fuels", AIAA Paper No. 73-177; pp. 1–12.

*Primary Examiner*—Robert E. Garrett
*Attorney, Agent, or Firm*—R. S. Sciascia; Roy Miller; Kenneth Pritchard

[57] ABSTRACT

The overall efficiency of a reaction engine having primary and secondary combustion chambers is greatly improved by reducing the primary exhaust velocity to subsonic speed. This is accomplished in a preferred embodiment by using an exhaust tube downstream of the primary nozzle. A tube diameter of about six times that of the primary throat diameter and a tube length of about five to ten times that of the tube diameter is considered optimum.

6 Claims, 2 Drawing Figures

COMBUSTION EFFICIENCY IN BORON PROPELLANT DUCTED ROCKET WITH SUPERSONIC (A) AND SUBSONIC (B) PRIMARY EXHAUST VELOCITY

DUCTED ROCKETS

This is a continuation of application Ser. No. 648,239, filed Jan. 12, 1976, now abandoned.

BACKGROUND OF THE INVENTION

This invention relates to reaction engines and more particularly to ducted rockets which consist chiefly of a primary chamber containing the fuel-rich propellant and a secondary chamber for after-burning of the reaction products from the primary chamber, which products are mixed with inducted air.

Most particularly, the present invention deals with mixing and combustion of a fuel-rich, particle laden jet in a secondary airstream in an air breathing ducted rocket, for example. In rockets of this type which are special types of ramjets, fuel-rich solid propellants having high mass fractions of metals (e.g., boron) are burned in a primary chamber to produce combustion products containing unreacted gaseous and particulate fuels. The exhaust flow of the primary chamber must be supersonic. This is satisfied by any configuration of the primary nozzle that produces a supersonic flow. Said supersonic flow insures that the primary chamber pressure is at least twice the secondary chamber pressure, which prevents secondary chamber pressure fluctuations from effecting the primary chamber pressure. The primary chamber products are injected into a secondary chamber where they mix, ignite, and burn with a subsonic airstream. For maximum overall efficiency these processes must be completed before the gas/particle mixture is ejected from the rocket nozzle.

A further and more complete background of the invention may be had by reference to the following.

1. Schadow, K., "The Influence of Combustion Parameters on the Combustion of Particle-Laden Fuels in Ducted Flow," Eleventh Aerospace Sciences Meeting, Washington, D.C., AIAA Paper 73-177, January 1973.
2. Schadow, K., "Boron Combustion Characteristics in Ducted Rockets," COMBUST SCI AND TECH, Vol. 5, No. 4, June 1972, p. 107.
3. Schadow, K., "Study of Gaseous Nonequilibrium Effects in Particle-Laden Ducted Flows for Improvement of the Combustion Efficiency," AIAA Paper 72-36, Tenth Aerospace Sciences Meeting, San Diego, CA., January 1972.
4. Schadow, K., "Study of Gas-Phase Reactions in Particle-Laden, Ducted Flows," AIAA J, Vol. 11, No. 7, July 1973, p. 1042.
5. Abbott, S. W., Smoot, L. D., and Schadow, K., "Direct Mixing and Combustion Efficiency Measurements in Ducted, Particle-Laden Jets," AIAA J, Vol. 12, No. 3, March 1974, pp. 275-82.
6. Roberts, R., "Boron Combustion: A review," Ninth International Symposium on Space Technology and Science, Tokyo, 1971.
7. Barrere, M., "Rocket Propulsion," Elsevier Pub. Co. 1960, pp. 389-99.

DESCRIPTION AND OPERATION

Figure 1:
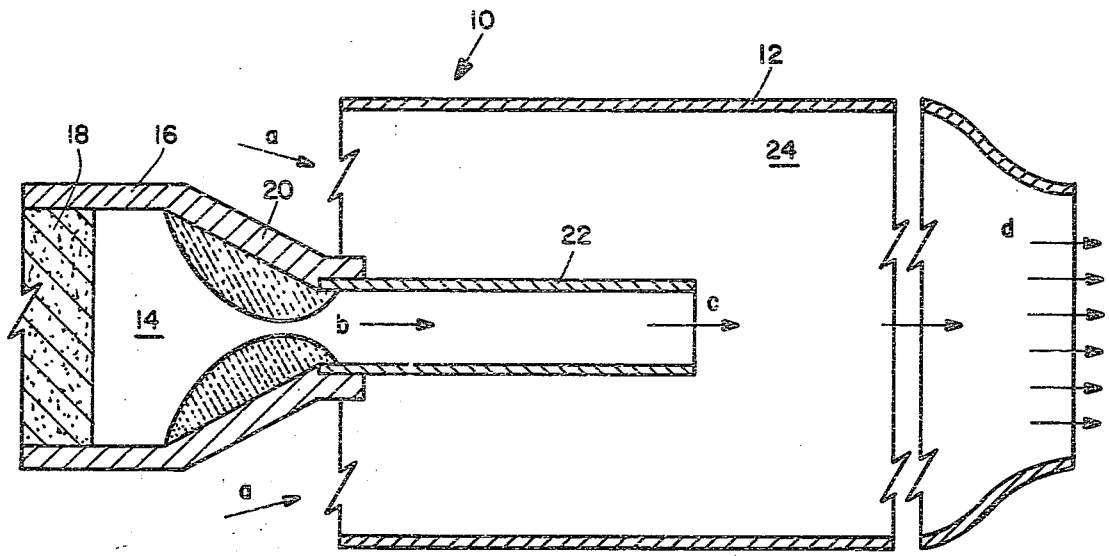
FIG. 1 is a longitudinal cross-sectional view of a ducted rocket with a primary chamber according to the present invention.

Referring now to the drawing and more particularly to FIG. 1, there is shown a reaction motor designated by reference numeral 10. Motor 10 comprises an enclosing casing 12 substantially cylindrical in form, and having forward openings (not shown) which admit air represented by arrows at a. A primary chamber 14 is enclosed in a casing 16 which contains the propellant grain 18.

Chamber 14 is closed at the forward end (not shown) and is equipped with a nozzle 20 at the aft end. After the nozzle 20, there is a fixed elongated tube 22 which entends partially into the secondary chamber 24.

When the fuel grain 18 burns in chamber 14, the products of combustion exit through nozzle 20 at supersonic speeds (arrow b). Nozzle 20 may be any configuration that does produce supersonic flow. By the time these products of combustion pass through tube 22, the speed is sufficiently diminished such that, when the gases exit from tube 22 (arrow c), the velocity is subsonic. Further burning of the above mentioned products takes place in secondary chamber 24 and thrust is produced as the final products exit from the motor as shown by the arrows at d. Note that none of the usual enhanced mixing techniques are employed in the secondary chamber.

For optimum results, the inside diameter of tube 22 should be about six times that of the throat diameter of nozzle 20 at the narrowest part thereof and the length of the tube from the narrowest part of nozzle 20 should be from five to ten times the inside diameter of the tube. As shown by the arrows in FIG. 1, the primary exhaust flow is parallel to the sides of the secondary chamber and parallel to the flow of ram air. This means that the only type of mixing present is caused by diffusion.

Figure 2:
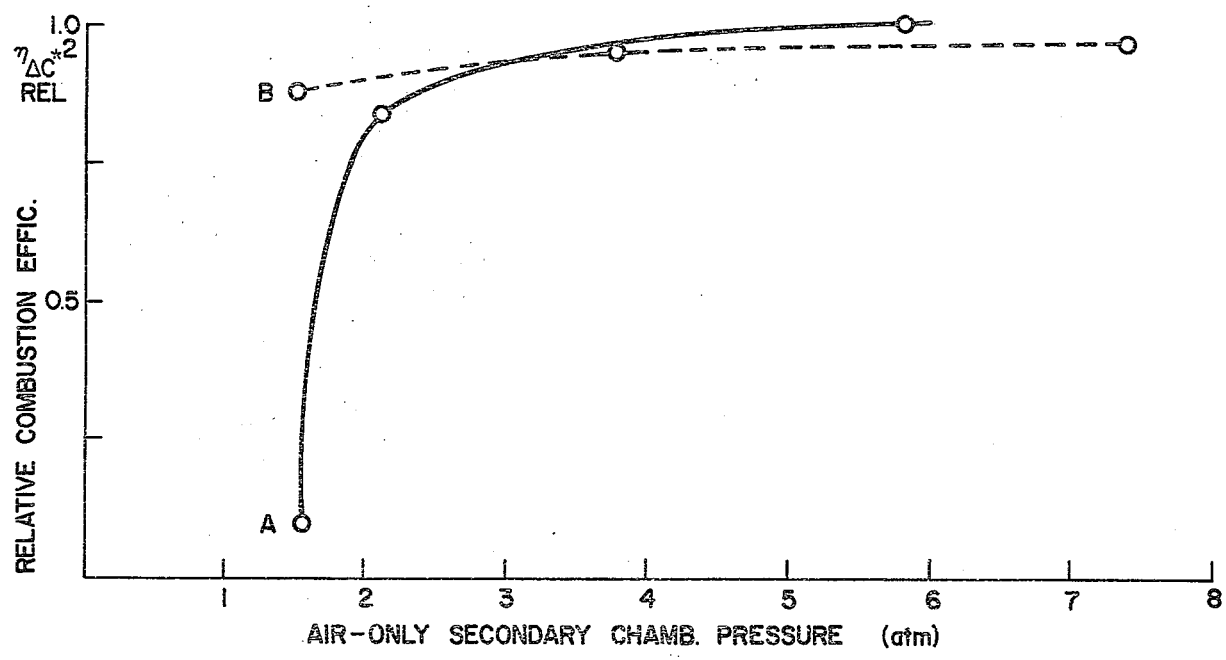
FIG. 2 is a graph showing the relative combustion efficiency of the present invention in comparison with a prior art device.

Reduction of the primary exhaust velocity to subsonic speeds (Curve B) strongly improves the efficiency of the motor as indicated in FIG. 2. For subsonic conditions, the efficiency was nearly independent of secondary chamber pressure ($1.6$ kg/cm$^2$ < p < $7$ kg/cm$^2$). For supersonic primary exhaust (Curve A), the combustion efficiency strongly decreased with decreasing pressure. In FIG. 2, the relative combustion efficiency ($\eta\Delta c^{*2}$) is shown as a function of secondary chamber pressure. Relative efficiency is based on a comparison of results of tests 1-7 (high pressure) as shown in Table 1 and tests 44-57 (low pressure) in Table 2.

Table 1.

| | | | | | | | | | | | | | | | | | |
|---|---|---|---|---|---|---|---|---|---|---|---|---|---|---|---|---|---|
| | | Test program for system with supersonic primary exhaust | | | | | | | | | | | | | | | |
| | Primary Chamber | | | | | | | | Secondary Chamber | | | | | | | | |
| | Solid Propellant Motor | | | | Blast Tube | | | | | | | | | | | | |
| Test No. | AP/BI/AD/B wt. % | $D_{TM}$ cm | $P_{CM}$ kg/cm$^2$ | $\dot{m}_{pr}$ kg/ sec | $T_{CM}$ °K | $D_{TB}$ cm | $P_{CP}$ kg/cm$^2$ | $V_{EX\text{-}P}$ Mach | $H_S$ cm | $D_{TS}$ cm | $L^*$ m | $\dot{m}_a$ kg/ sec | $v_{aRS}$ m/sec | a/f | $t_{RES}$ msec | $P_{RS}$ kg/ cm$^2$ | $\eta_{REL}$ |
| 1 | 25/21/4/50 | — | 26.5 | 0.086 | 1340 | 0.5 | 26.5 | 1.3 | 7.5 | 4.7 | 7.9 | 1.66 | 48 | 19.5 | 17 | 5.8 | 1.0 |
| 2 | " | 0.5 | 28.1 | 0.095 | 1340 | 0.89 | 8.6 | 1.3 | 15 | 8.1 | 3.8 | 1.67 | 72 | 17.5 | 8 | 2.1 | 0.84 |
| 3 | " | — | 39.9 | 0.077 | — | 0.4 | 39.9 | 2.5 | 15 | 6.7 | 3.2 | 1.4 | 39 | 18.3 | 7 | 1.57 | 0.11 |
| 4 | " | 0.5 | 17.3 | 0.058 | 1350 | 0.89 | 5.3 | 1.1 | 15 | 8.1 | 3.8 | 1.67 | 72 | 28.7 | 9 | 2.1 | 0.63 |

Table 1.-continued

Test program for system with supersonic primary exhaust

| Test No. | AP/BI/AD/B wt. % | Solid Propellant Motor | | | | Blast Tube | | | Secondary Chamber | | | | | | | | |
|---|---|---|---|---|---|---|---|---|---|---|---|---|---|---|---|---|---|
| | | $D_{TM}$ cm | $P_{CM_2}$ kg/cm² | $\dot{m}_{pr}$ kg/sec | $T_{CM}$ °K | $D_{TB}$ cm | $P_{CP_2}$ kg/cm² | $v_{EX-P}$ Mach | $H_S$ cm | $D_{TS}$ cm | $L^*$ m | $\dot{m}_a$ kg/sec | $v_{aRS}$ m/sec | a/f a | $t_{RES}$ msec | $P_{RS_2}$ kg/cm² | $\eta_{REL}$ |
| 5 | " | 0.5 | 7.0 | 0.023 | 1350 | 0.68 | 4.3 | 1.1 | 15 | 8.1 | 3.8 | 1.67 | 72 | 71.2 | 12 | 2.1 | 0.10 |
| 6 | " | — | 16.3 | 0.049 | — | 0.46 | 16.3 | 1.5 | 10 | 3.6 | 11.7 | 0.64 | 65 | 13.5 | 23 | 2.5 | 0.49 |
| 7 | " | — | 62.8 | 0.019 | 1300 | 0.25 | 23.2 | 2.0 | 7.5 | 2.5 | 27.8 | 0.18 | 10 | 8.9 | 46 | 3.1 | 0.09 |

Air temperature $T_a = 550°$ K

TABLE 2

Test program for system with subsonic primary exhaust

| Test No. | AP/BI/AD/B wt. % | Solid Propellant Motor | | | | Blast Tube | | | Secondary Chamber | | | | | | | | |
|---|---|---|---|---|---|---|---|---|---|---|---|---|---|---|---|---|---|
| | | $D_{TM}$ cm | $P_{CM_2}$ kg/cm² | $\dot{m}_{pr}$ kg/sec | $T_{CM}$ °K | $D_{TB}$ cm | $P_{CP}$ kg/cm² | $v_{EX-P}$ Mach | $H_S$ cm | $D_{TS}$ cm | $L^*$ m | $\dot{m}_a$ kg/sec | $v_{aRS}$ m/sec | a/f a | $T_{RES}$ msec | $P_{RS_2}$ kg/cm² | $\eta_{REL}$ |
| 44 | 25/21/4/50 | 0.4 | 32.8 | 0.064 | — | 1.6 | 19.0 | 0.4 | 7.5 | 3.0 | 1.9 | 1.29 | 14 | 20.1 | 42 | 7.4 | 0.95 |
| 45 | " | 0.4 | 47.0 | 0.087 | — | 1.6 | 10.7 | 0.4 | 7.5 | 4.2 | 9.8 | 1.26 | 28 | 14.6 | 20 | 3.75 | 0.9 |
| 46 | " | 0.4 | 31.6 | 0.059 | 1580 | 1.6 | 3.5 | 0.4 | 15 | 6.7 | 5.5 | 1.38 | 38 | 23.4 | 13 | 1.57 | 0.86 |
| 47 | " | — | 56.7 | 0.108 | 1670 | 0.4 | 56.7 | 1.6 | 7.5 | 3.0 | 8.1 | 1.40 | 15 | 13.3 | 16 | 7.84 | 0.27 |
| 48 | " | — | 43.0 | 0.079 | 1700 | 0.4 | 43.0 | 2.1 | 7.5 | 4.2 | 8.3 | 1.43 | 16 | 18.2 | 9 | 3.92 | 0.12 |
| 49 | " | 0.4 | 38.4 | 0.070 | — | 1.6 | 5.2 | 0.4 | 15 | 4.2 | 1.4 | 6.58 | 16 | 8.3 | 25 | 1.62 | 1.00 |
| 50 | " | 0.4 | 31.6 | 0.059 | 1530 | 1.6 | 3.5 | 0.4 | 15 | 6.7 | 5.5 | 1.38 | 39 | 23.4 | 13 | 1.57 | 0.86 |
| 51 | " | 0.4 | 38.0 | 0.059 | — | 1.6 | 2.7 | 0.4 | 15 | 9.5 | 2.7 | 2.64 | 73 | 37.8 | 7 | 1.6 | 0.70 |
| 52 | " | 0.3 | 39.2 | 0.030 | — | 1.6 | 3.9 | 0.4 | 7.5 | 4.7 | 7.9 | 0.70 | 38 | 23.2 | 18 | 1.59 | 1.0 |
| 53 | " | 0.3 | 24.7 | 0.042 | — | 1.6 | 3.5 | 0.4 | 15 | 5.6 | 7.9 | 0.91 | 25 | 21.9 | 18 | 1.6 | 0.91 |
| 54 | " | 0.4 | 31.6 | 0.059 | 1580 | 1.6 | 3.4 | 0.4 | 15 | 6.7 | 5.5 | 1.38 | 40 | 23.4 | 13 | 1.57 | 0.86 |
| 55 | 24/15/21/40 | 0.4 | 21.0 | 0.035 | 1510 | 1.6 | — | 0.4 | 15 | 15 | 1.1 | 4.1 | 380 | 53 | 3 | 0.98 | — |
| 56 | " | — | 20.7 | 0.036 | 1460 | 0.4 | 20.7 | 2.6 | 15 | 15 | 1.1 | 3.8 | 350 | 47 | 3 | 0.98 | — |
| 57 | " | 0.4 | 21.0 | 0.034 | 1420 | 1.6 | — | 0.4 | 15 | 15 | 1.1 | 4.2 | 385 | 56 | 3 | 0.98 | — |

Air temperature $T_a = 285°$ K (Tests 44-54) and $T_a = 550°$ K (Tests 55-57)

Nomenclature

| | | |
|---|---|---|
| a/f | — | Air-to-propellant ratio |
| A | cm² | Area |
| AP | — | Ammonium perchlorate |
| AD | — | Additive to solid propellant |
| BI | — | Binder |
| BU | — | Butarez |
| c* | m/sec | Characteristic velocity |
| D | cm | Diameter |
| H | cm | Height |
| $I_{sp}$ | sec | Specific impulse |
| L* | m | Characteristic length |
| L | m | Length |
| $\dot{m}$ | kg/sec | Mass flow |
| M | wt. % | Mass percentage |
| P | kg/cm² | Pressure |
| T | K | Temperature |
| t | sec | Time |
| v | m/sec | Velocity |
| η | — | Combustion efficiency |
| γ | — | Ratio of specific heat |
| Subscripts | | |
| a | — | Air |
| b | — | Boron |
| CM | — | Combustion, solid propellant motor |
| CP | — | Combustion, primary chamber upstream primary nozzle |
| CS | | Combustion, secondary chamber |
| EX-P | | Exit, primary chamber |
| o | | Oxygen |
| REL | | With η: combustion efficiency relative to Test 1 at high pressure |
| RES | | Residence |
| RS | | Air-only (recovery) conditions in secondary chamber |
| P | | Primary chamber |
| pr | | Solid propellant |
| S | | Secondary chamber |
| TM | | Throat, solid propellant motor |
| TP | | Throat, primary nozzle (fuel inlet into secondary chamber) |
| TS | | Throat, secondary chamber |
| theor | | Theoretical |
| ΔT | | Temperature rise from air-only conditions to combustion |

With subsonic primary exhaust, the efficiency (1) decreased only slightly with decreasing secondary chamber pressure (note tests 44 and 46 in Table 2); (2) decreased slightly with increasing propellant mass flow (tests 52 and 54); and (3) decreased with increasing air-to-propellant ratio (tests 49 and 51). In all tests with subsonic exhaust, a brilliant white flame was anchored at the primary nozzle.

With supersonic primary exhaust, the combustion efficiency strongly decreased with decreasing secondary chamber pressure (Note tests 1, 2, and 3 in Table 1).

From the previous discussions it may be seen that reduction of the primary exhaust velocity to subsonic speed strongly improved the ignition process of the gaseous component; (1) plume ignition was achieved in the extreme fore-end of the mixing region independent of the motor parameters, (2) the combustion temperatures were always above the ignition temperature of boron particles independent of the air-to-propellant ratio, and (3) the critical boron loading to achieve plume ignition at low primary chamber temperatures was reduced compared to supersonic exhaust. From these improvements of the gaseous fuel combustion, improved boron combustion efficiency was demonstrated with typical solid boron propellants.

I claim:

1. The method of improving efficiency of rocket engines having a primary and a secondary combustion chamber including the step of:
   burning a solid propellant in a primary chamber to produce combustion products;
   placing a nozzle at the open end of the primary chamber through which the combustion products of the primary chamber must flow;
   maintaining a supersonic flow of the combustion products through the nozzle;
   slowing the supersonic flow to subsonic after it has passed through the nozzle, but prior to its entrance in the secondary chamber;
   restricting the subsonic flow so that it travels parallel to the secondary chamber axis when it enters the secondary chamber; and
   restricting the flow of ram air as it enters the secondary chamber so that it travels parallel to the secondary chamber axis, so that it limits the mixing process between the ram air and combustion products to one of diffusion only.

2. The method of claim 1 wherein said solid propellant includes boron and the said products of combustion comprise a fuel rich mixture including boron particles.

3. The method of claim 1 wherein said solid propellant includes a high mass fraction of metal and said products of combustion contain unreacted gaseous and particulate fuels.

4. The method of claim 3 wherein said metal consists essentially of Boron.

5. In a ducted rocket having primary and secondary combustion chambers, the improvement comprising:
   said primary chamber having a nozzle from which combustion products exit to said secondary chamber;
   means for maintaining a supersonic flow through the nozzle in said primary chamber;
   an elongated tube attached to the nozzle in said primary chamber for slowing the combustion products to subsonic speed prior to emerging in the secondary chamber and shaped to restrict the direction of combustion products flow to be parallel to the axis of the secondary chamber; and
   means for providing ram air into the secondary chamber traveling parallel to the axis of the secondary chamber so as to limit the mixing with the combustion products to that due to diffusion only and where the combustion products are at subsonic speeds.

6. Apparatus according to claim 5 wherein said tube is cylindrical.

* * * * *